July 18, 1939.   F. E. HOLSTEN   2,166,893
PROCESS OF TREATING PETROLEUM TANK BOTTOMS
Filed Dec. 12, 1936
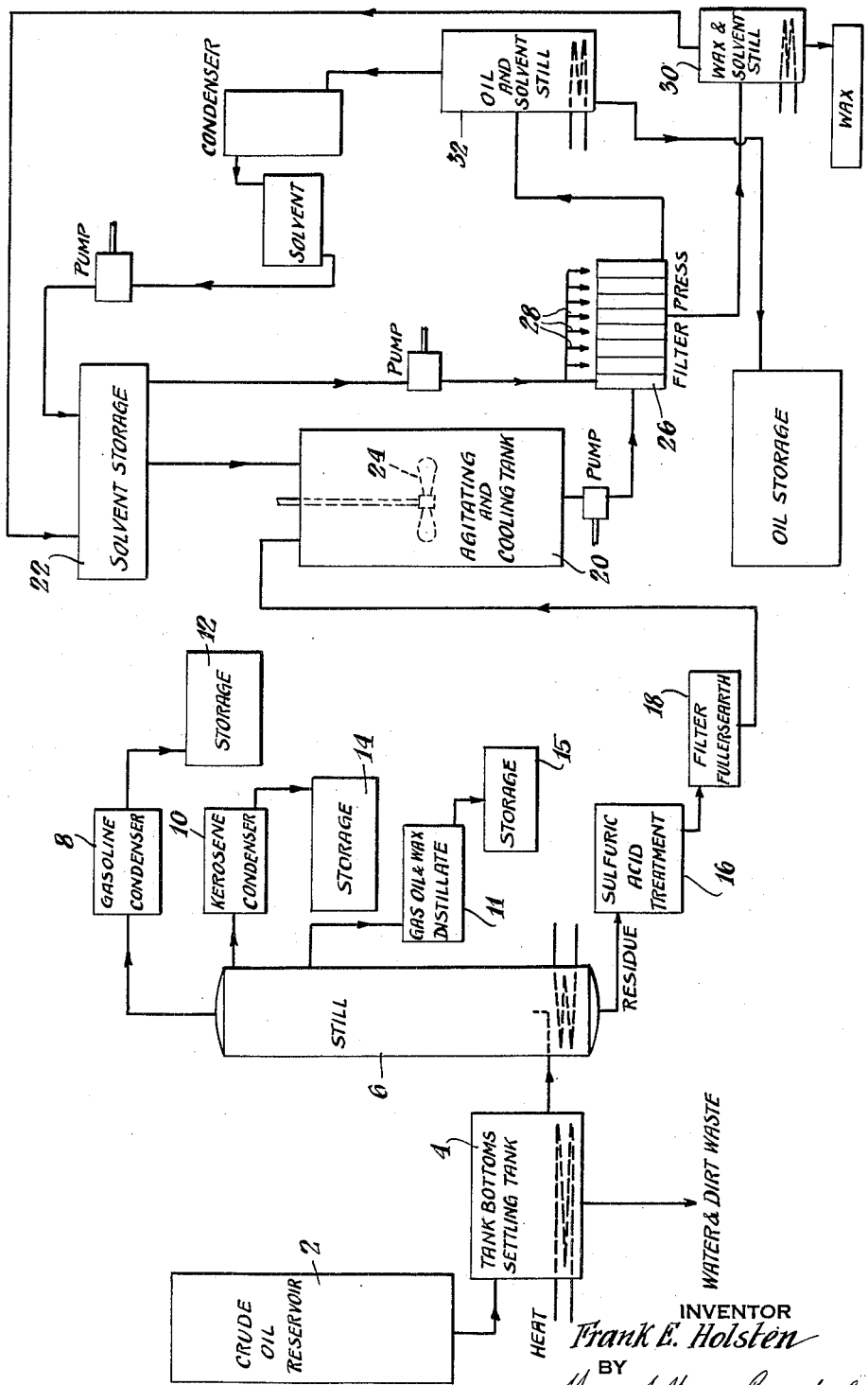
INVENTOR
Frank E. Holsten
BY
Hoguet, Neary & Campbell
ATTORNEYS Patented July 18, 1939

2,166,893

UNITED STATES PATENT OFFICE 2,166,893

PROCESS OF TREATING PETROLEUM TANK BOTTOMS

Frank E. Holsten, Tulsa, Okla.

Application December 12, 1936, Serial No. 115,468

12 Claims. (Cl. 196—5)

This invention relates to a method of recovering valuable products from crude petroleum waste products, particularly the waste product known in the industry as tank bottoms or tank settlings.

Petroleum tank bottoms is that material which settles out of crude oil on standing. It may consist of a mixture of varying proportions of asphaltic bodies, waxes, oils, water, and solid bodies such as dirt and sand, the variation in proportions producing many different types of tank bottoms, none of which have heretofore been considered of any value.

This material is usually separated from the crude oil before the latter is removed from the field where produced to the refinery although it may be separated later. Disposal of the tank bottoms has been something of a problem to the oil industry, because of a tendency of the material to settle out in the pipe lines and clog them or produce a difficultly removable thick layer in the bottom of the storage containers, materially reducing their capacity. Tank bottoms are commonly disposed of by segregating the material and burning it. Attempts have also been made to utilize it as a very low grade of fuel oil or cracking stock. However its value for such purposes is not great, the primary advantage being apparently the elimination of the material.

I have discovered that certain ingredients may be recovered from petroleum tank bottoms which have unique properties and which are of considerable value. Such bottoms I have found constitute a source of supply of certain high melting point waxes of unusual properties. High grade asphalt, gasoline, kerosene and lubricating oils may also be recovered.

The present invention is directed to a process whereby these valuable products may be separated on a commercial scale, from both point of yield and cost of production.

In the preferred process, the petroleum tank bottoms to be processed is freed of the dirt and water by any suitable process such as centrifuging, heating and settling, or filtration. The dirt and water are waste and are discarded.

The clean tank bottoms is then charged to a reducing still and distilled by known methods such as by fire and steam in a discontinuous still or by vacuum continuous distillation. This operation depends upon the character of the clean tank bottoms but it is preferable in all cases to reduce the clean tank bottoms to a residual bottoms having a flash point (Cleveland openers) of at least 500° F. The operation may be carried out in any manner that will separate the crude material without change. During the distillation, fractions containing gasoline, kerosene, and in some instances, depending on the source of the crude oil, gas oil and wax distillate are separated overhead, condensed and recovered. These products are of higher value than the material from which they were derived. A residual bottoms containing asphaltic bodies, waxes and oils remains in the still.

The residual bottoms is then treated to separate the asphaltic and dark colored bodies and to facilitate the recovery of the waxes therefrom by the production of a suitable wax base stock. This operation may consist of a treatment with sulphuric acid followed by neutralization of the free acid and filtration through fuller's earth. Solvent separation or other such means may also be used if a desirable asphaltic material is to be recovered. Proper treatment will result in the production of a base stock which contains desirable waxes and lubricating oils. This treatment may be so controlled as to facilitate the production of a high grade asphalt if desired. However, with regard to the production of the high melting point waxes the color of the material resulting from this operation should not be such as to hinder proper manipulation during the subsequent operations.

The wax base stock in general may be treated with a suitable selective solvent, preferably in accordance with the steps more specifically described below to obtain and recover an unusual plastic wax of high melting point and an amorphous-like microcrystalline structure. The melting point will vary, of course, with the source of the tank bottoms, the minimum, however, may be about 165° F. and the maximum about 185° F. A preferred solvent for this operation is ethylene dichloride or a mixture of solvents such as benzol and acetone or naphtha and butanol. The solvent used should be characterized by the ability to dissolve waxes at approximately 185° F. and at a lower temperature, for example, 110° F., act to cause precipitation of the waxes in filterable form.

A good grade of lubricating oil is also obtained as a by-product of the wax separating step having properties which will vary with the source of the raw material but having in general a high A. P. I. gravity, high flash, high viscosity index (Dean and Davis) and high pour point.

For a better understanding of the invention reference may be had to the accompanying drawing which indicates diagrammatically a typical flow sheet of the process.

The following description is an example of the process as applied to a tank bottoms obtained from a Kansas crude. It should be appreciated that in treating other tank bottoms with different characteristics, these specific conditions might not apply to obtain preferred results and thus the conditions set forth in this example may be varied within a considerable latitude without modifying the principal object of the particular step.

The crude tank bottoms separated by settling from the crude oil in storage tank 2, contained about 20% of bottom settling and water. Separation of the B. S. and water was made by heating to approximately 150° F. over a period of 24 hours, and settling in the crude tank bottoms settling tank 4. The solid matter and water were discarded as waste products. The clean tank bottoms had the following characteristics:

| | |
|---|---|
| Gravity A. P. I. | 36.7 |
| Flash point degrees F | 100 to 130 |
| Saybolt viscosity at 210° F | 37 |
| Cold test | 130 |

The clean tank bottoms was then reduced by fire and steam in still 6 to a residue having flash point in the vicinity of 500° F. The products passing overhead were liquefied in condensers 8, 10 and 11 and passed to storage tanks 12, 14 and 15, respectively. The products obtained from the distillation treatment had the following characteristics and were of the following approximate proportions:

*Gasoline 26%*

| | |
|---|---|
| Gravity, A. P. I. | 55.5 |
| Initial boiling point degrees F | 144 |
| Endpoint do | 404 |

*Kerosene 7%*

| | |
|---|---|
| Gravity, A. P. I. | 41 |
| Flash point degrees F | 188 |

*Gas Oil and Wax Distillate 19%*

| | |
|---|---|
| Gravity, A. P. I. | 35 |
| Flash point degrees F | 260 |
| Viscosity at 100° F | 42 |
| Cold test | 55 |

*Reduced Tank Bottoms 47%*

| | |
|---|---|
| Gravity, A. P. I. | 28.9 |
| Flash point degrees F | 480 |
| Viscosity at 210° F | 84 |
| Solid point degrees F | 165 |
| Color | Nearly black |

The reduced tank bottoms was then pumped to a treating tank 16 and treated with about 20 lbs. of 66° Bé sulphuric acid per barrel at a temperature of approximately 175° F. A treating loss of about 21% occurred at this stage of treatment. The treated reduced tank bottoms had the following characteristics:

| | |
|---|---|
| Gravity, A. P. I. | 30.6 |
| Solid point degrees F | 169 |
| Color 1/16" Lovibond cell | 300 |

The reduced treated tank bottoms was then filtered through fuller's earth, in filter 18 using approximately 25 tons of clay to 800 to 850 barrels of the treated tank bottoms. The filtrate had the following characteristics:

| | |
|---|---|
| Gravity, A. P. I. | 31.2 |
| Solid point degrees F | 169 |
| N. P. A. color | No. 8 |

The filtrate was heated to approximately 180° F. in agitating and settling tank 20 and approximately four parts of ethylene dichloride from the solvent storage tank 22 were mixed with one part of the filtrate, by means of agitator 24. The mixture of solvent and treated reduced tank bottoms was cooled gradually to 80° F. and held at this temperature over a period of approximately an hour with agitation to form a filterable wax.

The material was then passed through a filter press 26 provided with fabric covered leaves and a gas tight case capable of withstanding a pressure of 50 pounds per square inch. Additional inlet nozzles 28 were provided adjacent the leaves of the filter.

When a layer of wax of suitable thickness was deposited on the leaves of the press, the excess solvent and oil were blown from the press. Without releasing the pressure in the filter, clean ethylene dichloride was forced from the storage tank 22 through the press 26 until all the oil was removed from the wax.

The press was then drained, the wax stripped from the filter press leaves by solvent injected through the additional inlet nozzles 28 and mixed with the clean solvent. The wax and solvent were then pumped to still 30 and the solvent distilled off, refluxing being used to cause a clean separation of the wax and solvent. The distilled solvent was returned to the solvent storage tank 22.

The wax produced by this process, amounting to 60 to 65% of the treated reduced tank bottoms, had the following characteristics:

| | |
|---|---|
| Solid point degrees F | 177 |
| A. S. T. M. melting point do | 180 to 185 |

The wax was dry and on microscopic examination was found to be both microcrystalline and amorphous.

The filtrate from the wax filtration and washing step was also pumped to a third still 32 and distilled to recover the solvent and an oil amounting to between 35 and 40% of the treated reduced tank bottoms charging stock. The distilled solvent was returned to the solvent storage tank 22 and the oil segregated in oil storage tank 34. The recovered oil had the following characteristics:

| | |
|---|---|
| Gravity, A. P. I. | 25.4 |
| Flash degrees F | 480 |
| Cold test | 90 |
| Viscosity at 210° F | 70 |
| Viscosity at 130° F | 201 |
| Viscosity at 100° F | 375 |

(Viscosity at 100° F. calculated from A. S. T. M. viscosity temperature chart).

The foregoing procedure and resulting products will vary somewhat depending upon the type of crude oil tank bottoms used as a starting stock. Different crude oils vary, of course, and the tank bottoms will also vary. Such variations in procedure as combining two or more of the steps in a single operation as may be found desirable in the treatment of different starting stocks will be readily apparent to those skilled in the art and should be considered as falling within the scope of the invention. The description of the typical run made on a specific type of starting stock therefore should be considered as illustrative only, and not as limiting the scope of the following claims:

I claim:

1. A process of treating tank bottoms for the recovery of valuable products therefrom comprising heating said tank bottoms at a low temperature over an extended period of time to clean said tank bottoms by separating water and solid matter therefrom, delivering the cleaned tank bottoms to a still, distilling off the volatile constituents of the cleaned tank bottoms until a residue having a flash point of approximately 500° F. is produced, removing the residue from the still and dissolving the residue in a heated solvent to produce a solution from which wax fractions are precipitated upon cooling to produce a wax having a melting point of above 165° F.

2. A process of treating tank bottoms to recover high melting point wax therefrom comprising cleaning said tank bottoms by freeing it of solid matter and water, delivering the cleaned tank bottoms to a still, distilling said clean tank bottoms to produce a residue having a flash point of approximately 500° F., removing the residue from the still, dissolving said residue in a heated solvent to produce a solution from which wax fractions are precipitated upon cooling, chilling said solution to precipitate wax therefrom and separating said wax from said solvent.

3. A process of treating tank bottoms to recover high melting point wax therefrom, comprising reducing said tank bottoms to a residue having a flash point of approximately 500° F., dissolving said residue in a heated solvent to produce a solution from which wax fractions are precipitated by chilling, chilling said solution to approximately 80° F. to precipitate wax, and separating said wax from said solvent.

4. A process of treating tank bottoms to recover high melting point wax therefrom, comprising reducing said tank bottoms by the distillation of relatively low boiling point hydrocarbons to a residue having a flash point of approximately 500° F., removing the residue from the still, dissolving said residue in heated ethylene dichloride, chilling said solution to precipitate wax, delivering the solution and precipitated wax to a filter and separating said wax from said ethylene dichloride by filtration.

5. A process of treating tank bottoms containing solid matter and water to recover valuable hydrocarbons therefrom, comprising heating said tank bottoms at a low temperature over an extended period of time to separate the solid matter and water from said tank bottoms, delivering the clean tank bottoms to a still, distilling said tank bottoms when free of solid matter and water to a residue having a flash point of approximately 500° F. to separate valuable relatively low boiling point hydrocarbons therefrom and condensing the low boiling point hydrocarbons, treating such residue with acid, neutralizing said residue and thereafter filtering to remove asphaltic constituents to produce a base stock from which high melting point waxes can be derived.

6. A process of treating tank bottoms containing solid matter and water to recover valuable hydrocarbons therefrom, comprising heating said tank bottoms at approximately 150° F. over a period of about 24 hours to separate said solid matter and water and said tank bottoms, delivering the separated tank bottoms to a still, fractionally distilling said clean tank bottoms to a residue having a flash point of approximately 500° F., condensing the distillate to recover gasoline and kerosene and dissolving said residue in a heated solvent in which wax having a melting point in excess of 160° F. is insoluble at about 80° F.

7. A process of treating tank bottoms containing solid matter and water to recover valuable hydrocarbons therefrom, comprising heating said tank bottoms at approximately 150° F. over a period of about 24 hours to clean said tank bottoms of said solid matter and water, delivering the tank bottoms to a still, fractionally distilling said clean tank bottoms to a residue having a flash point of approximately 500° F., condensing the distillate to recover gasoline and kerosene, dissolving said residue in heated ethylene dichloride, and chilling the solution to precipitate wax having a melting point in excess of 160° F.

8. A process of treating tank bottoms containing solid matter and water to recover valuable hydrocarbons therefrom, comprising heating said tank bottoms at approximately 150° F. over a period of about 24 hours to clean said tank bottoms by the separation of said solid matter and water, delivering the clean tank bottoms to a still, fractionally distilling said clean tank bottoms to a residue having a flash point of approximately 500° F., condensing the distillate to recover gasoline and kerosene, dissolving said residue in heated ethylene dichloride, chilling the solution to precipitate wax, and separating the wax from the solution.

9. A process of treating tank bottoms containing solid matter and water to recover valuable hydrocarbons therefrom, comprising heating said tank bottoms at approximately 150° F. over a period of about 24 hours to clean said tank bottoms by the separation of said solid matter and water, delivering the clean tank bottoms to a still, fractionally distilling said clean tank bottoms to a residue having a flash point of approximately 500° F., condensing the distillate to recover gasoline and kerosene, dissolving said residue in heated ethylene dichloride, chilling the solution to approximately 80° F. to precipitate wax, and separating the wax from the solution.

10. A process of treating tank bottoms containing solid matter and water to recover valuable hydrocarbons therefrom, comprising heating said tank bottoms at approximately 150° F. over a period of about 24 hours to clean said tank bottoms by the separation of said solid matter and water, delivering the clean tank bottoms to a still, fractionally distilling said clean tank bottoms to a residue having a flash point of approximately 500° F., condensing the distillate to recover gasoline and kerosene, dissolving said residue in a heated solvent to produce a solution in which waxes which are present in the tank bottoms are insoluble at temperatures between about 80° F. and about 110° F., chilling the solution to precipitate the wax, filtering said solution to remove said wax, washing the said wax on said filter with additional solvent, and freeing said wax of said solvent by distillation.

11. A process of treating tank bottoms containing solid matter and water to recover valuable hydrocarbons therefrom, comprising heating said tank bottoms at approximately 150° F. over a period of about 24 hours to clean said tank bottoms by the separation of said solid matter and water, delivering the clean tank bottoms to a still, fractionally distilling said clean tank bottoms to a residue having a flash point of approximately 500° F., condensing the distillate to recover gasoline and kerosene, dissolving said residue in heated ethylene dichloride, chilling the solution to precipitate wax, delivering the chilled solution to a filter, filtering said solution to remove said wax, washing the said wax on said filter with additional ethylene dichloride to remove oil, dissolving said wax in additional heated clean ethylene dichloride, delivering the oil-free solution to a still and freeing said wax from said ethylene dichloride by distillation.

12. A process of treating tank bottoms containing solid matter and water to recover valuable hydrocarbons therefrom, comprising separating the dirt and water from said tank bottoms, delivering the cleaned tank bottoms to a still, distilling said clean tank bottoms to a residue having a flash point of at least 500° F., removing said residue from the still, treating said residue with sulfuric acid to remove asphaltic constituents, delivering the treated tank bottoms to a filter and filtering to separate out the asphaltic constituents to produce a base stock from which high melting point waxes may be derived.

FRANK E. HOLSTEN.